(12) United States Patent
Koo

(10) Patent No.: US 9,676,550 B2
(45) Date of Patent: Jun. 13, 2017

(54) BAG SUPPORTING DEVICE

(71) Applicant: Hong Sik Koo, Seoul (KR)

(72) Inventor: Hong Sik Koo, Seoul (KR)

( * ) Notice: Subject to any disclaimer, the term of this patent is extended or adjusted under 35 U.S.C. 154(b) by 0 days.

(21) Appl. No.: 14/900,615

(22) PCT Filed: Jul. 11, 2014

(86) PCT No.: PCT/KR2014/006233
§ 371 (c)(1),
(2) Date: Dec. 22, 2015

(87) PCT Pub. No.: WO2015/005710
PCT Pub. Date: Jan. 15, 2015

(65) Prior Publication Data
US 2016/0376100 A1    Dec. 29, 2016

(30) Foreign Application Priority Data

Jul. 11, 2013    (KR) .................. 10-2013-0081702

(51) Int. Cl.
| | | |
|---|---|---|
| B65F 1/00 | (2006.01) | |
| B65F 1/14 | (2006.01) | |
| B65B 67/12 | (2006.01) | |
| F16M 11/22 | (2006.01) | |
| B65F 1/16 | (2006.01) | |

(52) U.S. Cl.
CPC ........ B65F 1/1415 (2013.01); B65B 67/1255 (2013.01); B65F 1/16 (2013.01); F16M 11/22 (2013.01); *B65F 2001/1676* (2013.01); *B65F 2210/167* (2013.01)

(58) Field of Classification Search
CPC .. B65F 1/1415; B65F 1/16; B65F 2001/1676; B65F 2210/167; B65B 67/1255; F16M 11/22
USPC ...................................... 248/97, 99
See application file for complete search history.

(56) References Cited

U.S. PATENT DOCUMENTS

| | | | | |
|---|---|---|---|---|
| 1,922,938 A | * | 8/1933 | Elliott .............. | B65B 67/1255 248/125.3 |
| 2,995,329 A | * | 8/1961 | Talcott, Jr. ......... | B65B 67/1255 248/100 |
| 3,142,465 A | * | 7/1964 | Hellner ............. | B65B 67/12 211/12 |
| 3,768,763 A | * | 10/1973 | Hembree ............ | B65B 67/12 248/146 |

(Continued)

FOREIGN PATENT DOCUMENTS

| | | |
|---|---|---|
| KR | 20-0355078 Y1 | 7/2004 |
| KR | 20-0362972 Y1 | 9/2004 |

(Continued)

OTHER PUBLICATIONS

International Search Report in International Application No. PCT/KR2014/006233, dated Dec. 12, 2014.

*Primary Examiner* — Anita M King
(74) *Attorney, Agent, or Firm* — Park, Kim & Suh, LLC

(57) ABSTRACT

A bag supporting device is provided. The bag supporting device includes a bag coupling portion that presses an inner surface of a mouth of a bag to the outside by shape deformation and brings the mouth of the bag into close contact with an outer surface thereof while keeping the mouth of the bag opened. The bag coupling portion includes a through-hole that communicates with the mouth of the bag.

5 Claims, 5 Drawing Sheets

(56) References Cited

U.S. PATENT DOCUMENTS

| | | | | |
|---|---|---|---|---|
| 5,020,751 | A * | 6/1991 | Larkin | B65B 67/12 |
| | | | | 248/99 |
| 5,478,152 | A * | 12/1995 | Bogle | B65B 67/1222 |
| | | | | 220/9.4 |
| 6,367,822 | B1 * | 4/2002 | Hutchins | B62B 1/10 |
| | | | | 248/99 |
| 6,431,503 | B1 * | 8/2002 | Horan | B65B 67/1255 |
| | | | | 248/101 |
| 6,554,810 | B1 * | 4/2003 | Wilk | A61J 19/00 |
| | | | | 248/99 |
| 6,698,474 | B1 * | 3/2004 | Trsek | B65B 67/1255 |
| | | | | 141/315 |
| 6,705,575 | B1 * | 3/2004 | Hoy | B65B 67/1233 |
| | | | | 248/97 |
| 7,350,547 | B2 * | 4/2008 | Quiring | B65B 67/1238 |
| | | | | 141/316 |
| 2001/0032911 | A1 * | 10/2001 | Gabl | B65B 67/1205 |
| | | | | 248/99 |
| 2014/0314342 | A1 * | 10/2014 | Verma | B65B 67/1255 |
| | | | | 383/34 |

FOREIGN PATENT DOCUMENTS

| | | |
|---|---|---|
| KR | 20-2009-0006309 U | 6/2009 |
| KR | 10-1107781 B1 | 1/2012 |

* cited by examiner

[Fig.1]
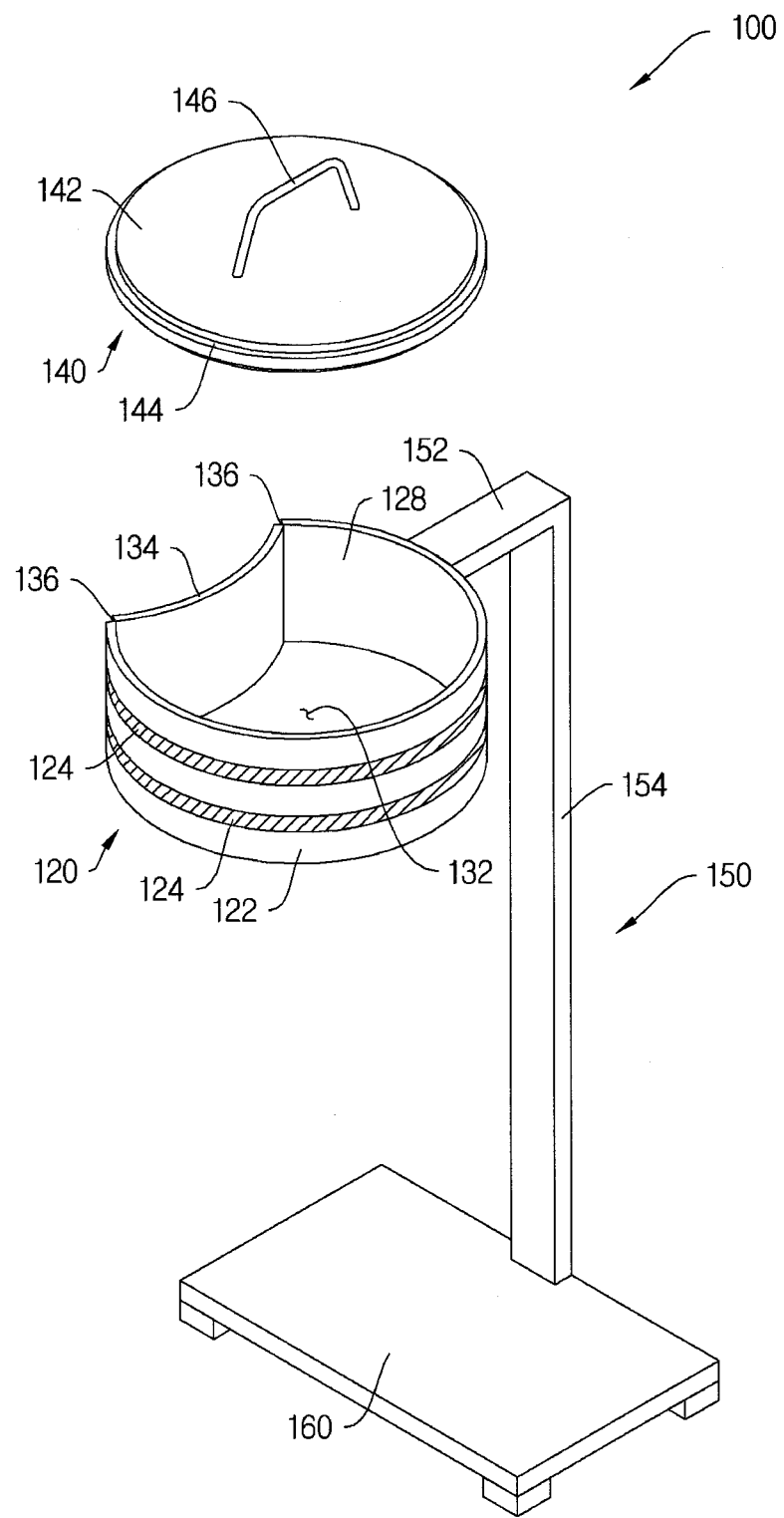

[Fig.2]
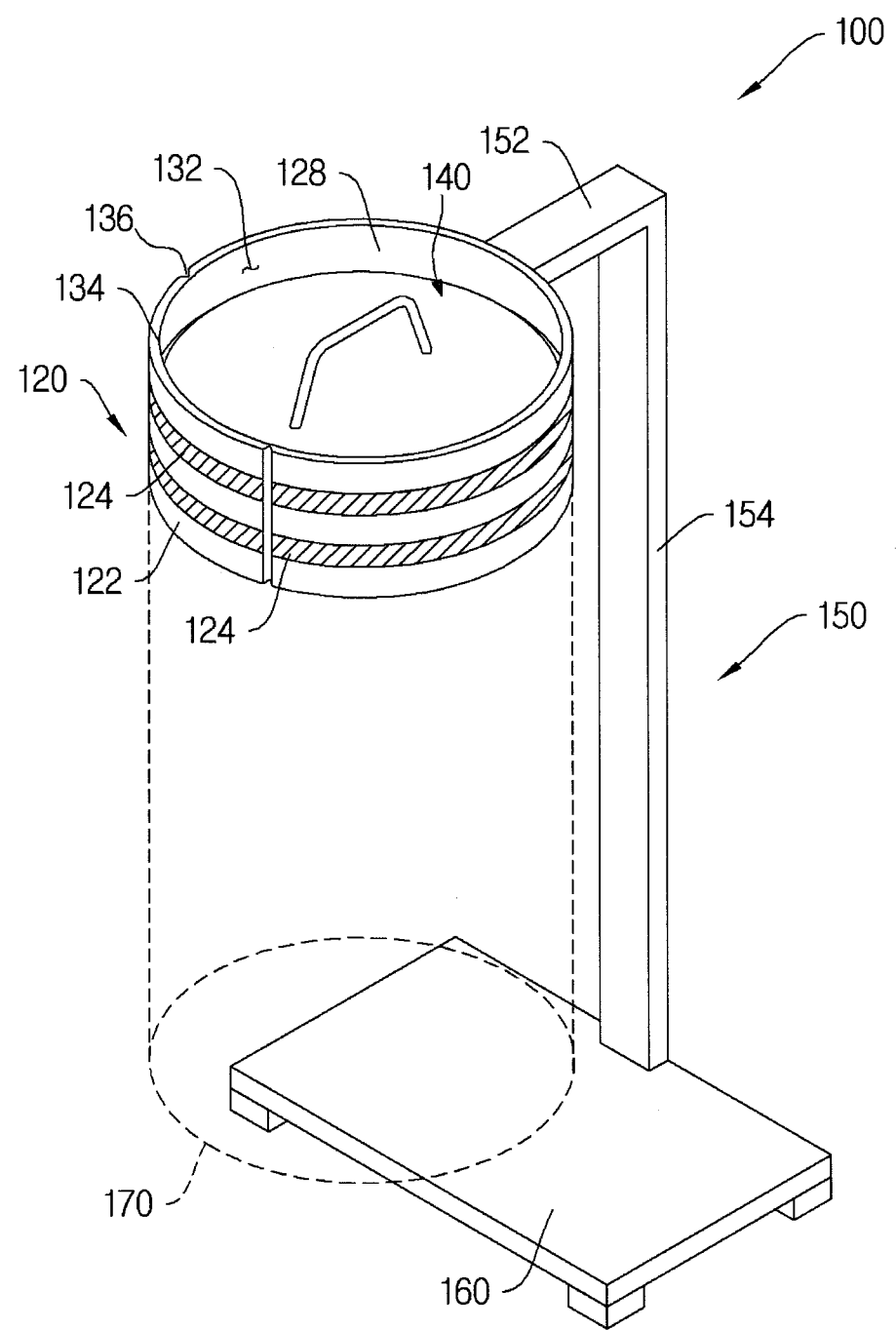

[Fig.3]
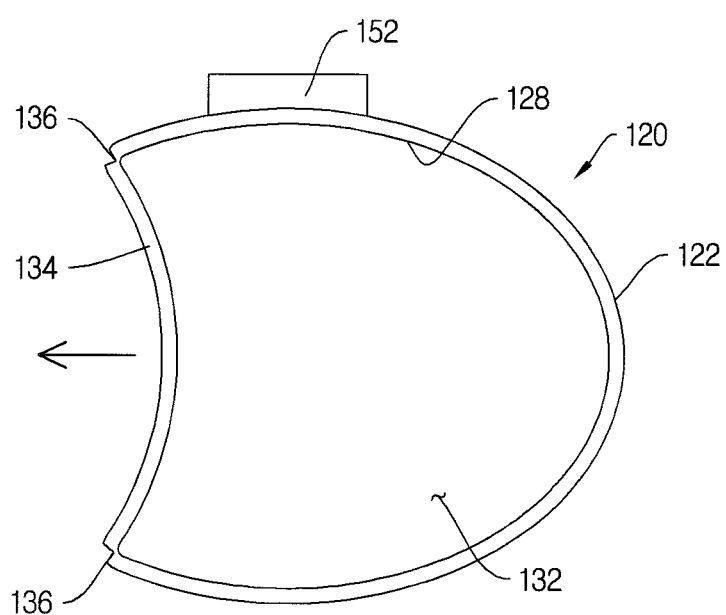

[Fig.4]
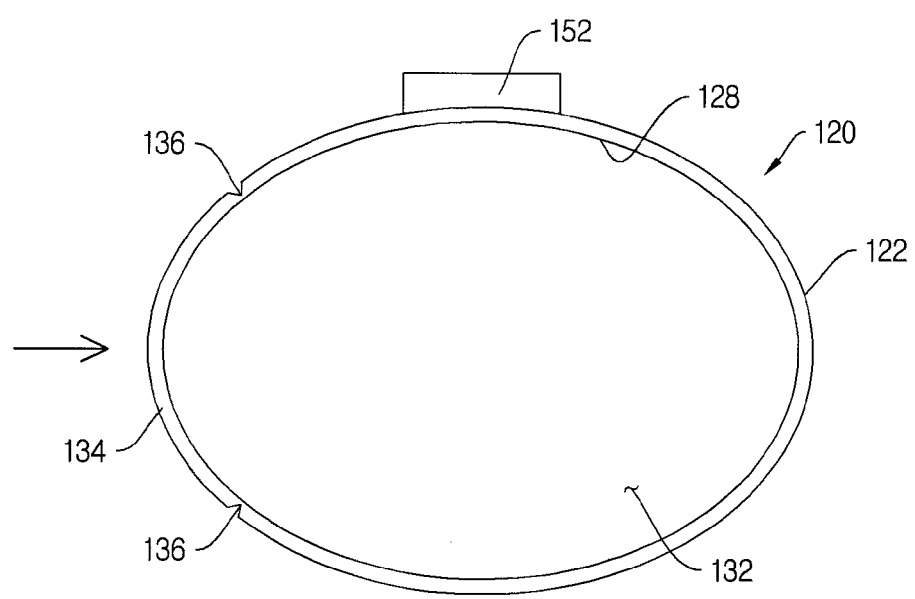

[Fig.5]
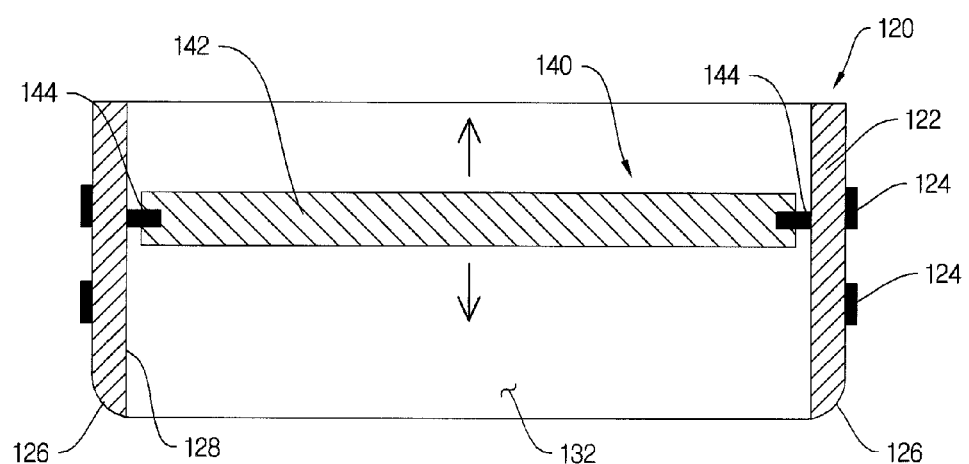

BAG SUPPORTING DEVICE

CROSS-REFERENCE TO RELATED APPLICATIONS

This application is the National Stage filing under 35 U.S.C. 371 of International Application No. PCT/KR2014/006233, filed on Jul. 11, 2014, which claims the benefit of Korean Patent Application No. 10-2013-0081702, filed on Jul. 11, 2013, the contents of which are all hereby incorporated by reference herein in their entirety.

TECHNICAL FIELD

The present invention relates to a bag supporting device, and more particularly, to a bag supporting device that can open a mouth of a bag and support the bag or close the mouth of the bag.

BACKGROUND ART

In general, a plastic bag such as a garbage bag or a food garbage bag has a constant volume and is thrown away with a mouth thereof bound when the volume is full. However, when the volume of the plastic bag is not full, the mouth of the garbage bag is opened, garbage is placed in the garbage bag, and then the mouth thereof is bound again until the volume is full. Accordingly, when a device capable of opening a plastic bag such as a garbage bag or a food garbage bag and supporting the garbage bag or closing the garbage bag is used, the mouth of the garbage bag does not need to be opened and bound again whenever garbage is placed in the garbage bag and thus the garbage bag can be conveniently used. In addition, bad smell from the garbage can be controlled and thus the garbage bag can be used sanitarily.

SUMMARY OF THE INVENTION

Technical Problem

Therefore, the present invention is made to solve the above-mentioned problem and an object thereof is to provide a bag supporting device with a simple configuration which can be conveniently used.

Other objects of the present invention will become more apparent from the following embodiments.

Solution to Problem

According to an aspect of the present invention, there is provided a bag supporting device including: a bag coupling portion that presses an inner surface of a mouth of a bag to the outside by shape deformation and brings the mouth of the bag into close contact with an outer surface thereof while keeping the mouth of the bag opened, wherein the bag coupling portion includes a through-hole that communicates with the mouth of the bag and a pressing member of which a part is reduced and enlarged.

The bag supporting device according to the present invention may have one or more of the following embodiments. For example, a frictional member may be disposed on an outer surface of the bag coupling portion.

The bag coupling portion may be fixed to a position with a constant height by a support.

A cover may be coupled to the bag coupling portion.

Advantageous Effects

According to the present invention, it is possible to provide a bag supporting device with a simple configuration which can be conveniently used.

BRIEF DESCRIPTION OF THE DRAWINGS

FIG. 1 is a perspective view illustrating a bag supporting device according to a first embodiment of the present invention.

FIG. 2 is a perspective view illustrating a state in which a bag is coupled to the bag supporting device illustrated in FIG. 1.

FIG. 3 is a plan view illustrating a state in which a bag coupling portion of the bag supporting device illustrated in FIG. 1 is reduced.

FIG. 4 is a plan view illustrating a state in which the bag coupling portion is enlarged in the state illustrated in FIG. 3.

FIG. 5 is a cross-sectional view illustrating a state in which a cover is coupled to the bag coupling portion of the bag supporting device illustrated in FIG. 1.

DESCRIPTION OF EMBODIMENTS

The invention can be modified in various forms and can have various embodiments. Specific embodiments will be illustrated in the drawings and described in detail. However, the embodiments are not intended to limit the invention, but it should be understood that the invention includes all modifications, equivalents, and replacements belonging to the concept and the technical scope of the invention. When it is determined that detailed description of known techniques involved in the invention makes the gist of the invention obscure, the detailed description thereof will not be made.

The terms used in the following description are intended to merely describe specific embodiments, but not intended to limit the invention. An expression of the singular number includes an expression of the plural number, so long as it is clearly read differently. The terms such as "include" and "have" are intended to indicate that features, numbers, steps, operations, elements, components, or combinations thereof used in the following description exist and it should thus be understood that the possibility of existence or addition of one or more other different features, numbers, steps, operations, elements, components, or combinations thereof is not excluded.

Terms such as inner, outer, upper, and lower can be used to describe various elements, but the elements should not be limited to the terms. The terms are used only for distinguishing one element from another element.

A bag to be described below has a bag shape and can be formed of various materials such as synthetic resin, paper, silicone, and fiber. The side and the bottom of the bag can be formed as surfaces, but may be formed as nets having large or small holes formed therein.

Hereinafter, embodiments of the invention will be described in detail with reference to the accompanying drawings. In describing the invention with reference to the accompanying drawings, like elements are referenced by like reference numerals or signs regardless of the drawing numbers and description thereof is not repeated.

Hereinafter, a bag supporting device 100 according to a first embodiment of the present invention will be described with reference to FIGS. 1 to 5.

FIGS. 1 and 2 are perspective views illustrating the bag supporting device 100 according to the first embodiment of the present invention, where FIG. 1 illustrates a state in which a bag 170 and a cover 140 are not coupled to each other and FIG. 2 illustrates a state in which the bag 170 and the cover 140 are coupled to each other. In FIGS. 1 and 2, the bag 170 is indicated by a dotted line for the purpose of convenience.

Referring to FIGS. 1 and 2, the bag supporting device 100 according to the first embodiment of the present invention includes a bag coupling portion 120 that is coupled to a mouth of the bag 170, a support 150 that supports the bag coupling portion 120 at a constant height, a base 160 that is coupled to an end of the support 150, and a cover 140 that is inserted into the bag coupling portion 120 and the bag 170.

A part of the bag coupling portion 120 is elastically deformed and the outer diameter of the bag coupling portion 120 is enlarged or reduced by the deformation. Accordingly, when the bag 170 is inserted (which includes positioning the bag on the circumference of the bag coupling portion 120: the same is true in the following description) into the bag coupling portion 120 and then the outer diameter of the bag coupling portion 120 is enlarged as illustrated in FIG. 2 in a state in which the outer diameter of the bag coupling portion 120 is reduced as illustrated in FIG. 1, the mouth of the bag 170 can be fixed to the outer surface 122 of the bag coupling portion 120. Accordingly, the bag 170 can be maintained in a constant shape while keeping the mouth opened by the bag coupling portion 120.

In the bag supporting device 100 according to this embodiment, the bag coupling portion 120 is coupled to the bag 170 by its elastic deformation, there is an advantage that the configuration thereof is simple. Since a user can insert the bag 170 into the bag coupling portion 120 in a state in which a pressing member 134 corresponding to a part of the bag coupling portion 120 is reduced as illustrated in FIG. 1 and then can elastically enlarge the pressing member 134 corresponding to a part of the bag coupling portion 120 as illustrated in FIG. 2, there is also an advantage that the bag supporting device can be conveniently used.

FIG. 3 is a plan view illustrating a state in which the pressing member 134 of the bag coupling portion 120 is reduced. FIG. 4 is a plan view illustrating a state in which the pressing member 134 of the bag coupling portion 120 illustrated in FIG. 3 is elastically deformed and enlarged to the outside. FIG. 5 is a cross-sectional view illustrating a state in which the cover 140 is coupled to the bag coupling portion 120 of the bag supporting device 100 illustrated in FIG. 1.

Referring to FIGS. 1 to 5, the mouth of the bag 170 is inserted onto the circumference of the outer surface 122 of the bag coupling portion 120. The bag coupling portion 120 includes the pressing member 134 and presses the inner surface of the mouth of the bag 170 to the outside by the elastic deformation of the pressing member 134 (enlargement to the outside in a state in which the pressing member is reduced inward). Accordingly, the bag 170 is fixed to a position around the outer surface 122 of the bag coupling portion 120 while keeping the mouth of the bag opened by the bag coupling portion 120.

The bag coupling portion 120 has a cross-section having an elliptical shape and a through-hole 132 is formed at the center thereof. The bag coupling portion 120 has a constant height and includes an outer surface 122 and an inner surface 128. A part of the bag coupling portion 120 corresponds to the pressing member 134 which can be elastically deformed.

The pressing member 134 can be formed of a material having elasticity such as plastic resin or metal, and is not limited to the materials as long as the pressing member has elasticity. The pressing member 134 formed as a part of the bag coupling portion 120 has elasticity and the shape can be elastically deformed. For example, the pressing member 134 can be bent inward as in the state illustrated in FIG. 3 and can be elastically deformed to protrude outward as in the state illustrated in FIG. 4.

Bending points 136 formed to be thinner than the other portion are formed at both ends of the pressing member 134. The pressing member 134 can be bent about the bending points 136. The pressing member 134 may not include the bending points 136. In this case, the pressing member 134 may be formed of a material having elasticity and a potion other than the pressing member 134 may be formed of a material not having elasticity. Connecting portions between the pressing member 134 and the portion other than the pressing member 134 have a structure capable of allowing movement of the pressing member 134 when the pressing member 134 is pushed aside.

When the pressing member 134 of the bag coupling portion 120 is deformed inward as illustrated in FIG. 3, the circumferential length of the bag coupling portion 120 is reduced and thus the bag 170 having a constant mouth size can be inserted onto the circumference of the bag coupling portion 120. At this time, the outer surface 122 of the bag coupling portion 120 may not press the inner surface of the mouth of the bag 170 outward.

When the bag 170 is inserted onto the circumference of the bag coupling portion 120 in the state illustrated in FIG. 3 and then the pressing member 134 is elastically deformed outward as illustrated in FIG. 4, the circumferential length of the bag coupling portion 120 is enlarged. Accordingly, the outer surface 122 of the bag coupling portion 120 presses the inner surface of the mouth of the bag 170 outward and thus the bag 170 can come in close contact with and be fixed to the outer surface 122 of the bag coupling portion 120. By the deformation in which the pressing member 134 is enlarged outward, the mouth of the bag 170 inserted onto the circumference of the bag coupling portion 120 may be deformed outward.

The bag coupling portion 120 of the bag supporting device 100 according to the first embodiment has an elliptical cross-section, but the bag coupling portion of the bag supporting device according to the present invention is not limited to this shape. Accordingly, the bag coupling portion may have various shapes such as a circular shape or a polygonal shape.

The pressing member 134 of the bag coupling portion 120 has an arc shape and one pressing member is disposed as a part of the bag coupling portion 120, but the shape and the number of pressing members are not limited to the above-mentioned examples. For example, the pressing member may have a polygonal shape having two or more bending points and two or more pressing members may be disposed in the bag coupling portion 120.

A frictional member 124 is formed on the outer surface 122 of the bag coupling portion 120. The frictional member 124 is formed along the circumference of the outer surface 122 of the bag coupling portion 120. The surface of the frictional member 124 has a frictional force and prevents the bag 170 closely contacting and fixed to the outer surface 122 of the bag coupling portion 120 from being easily detached therefrom. The frictional member 124 may be formed of a material having a frictional force such as rubber or silicon or may be embodied by a protrusion (not illustrated) or a groove (not illustrated) formed in a part of the outer surface 122 of the bag coupling portion 120 to give a frictional force.

The frictional member 124 is present between the outer surface of the bag coupling portion 120 and the inner surface of the bag 170 and has a function of sealing the clearance therebetween. That is, the frictional member 124 has a packing function of preventing garbage smell from leaking therefrom.

A rounded portion 126 curved to be inclined inward is formed at the lower end of the bag coupling portion 120. The rounded portion 126 enables easy insertion of the mouth of the bag 170 onto the circumference of the bag coupling portion 120.

The inner surface 128 of the bag coupling portion 120 defines the through-hole 132. The through-hole 132 corresponds to a hole formed at the center of the bag coupling portion 120 and communicates with the bag 170 inserted onto the bag coupling portion 120 as illustrated in FIG. 2. Accordingly, the bag coupling portion 120 and the bag 170 coupled thereto have a configuration similar to the configuration of a wastebasket, and the through-hole 132 of the bag coupling portion 120 corresponds to a mouth of the wastebasket.

The bag coupling portion 120 has a constant height and has a constant coupling area to the bag 170 coming in close contact with the outer surface 122 thereof.

The bag coupling portion 120 has a constant height due to the support 150. The support 150 is coupled to one top end portion of the bag coupling portion 120 and includes a horizontal member 152 and a vertical member 154. The vertical member 154 is provided to cause the bag coupling portion 120 to have a constant height from a base 160 located on the floor.

The support 150 may have a structure (not illustrated) capable of adjusting the height and may adjust the height of the bag coupling portion 120.

The base 160 is coupled to an end of the vertical member 154 and prevents the support 150 and the bag coupling portion 120 from falling. A member having a frictional force such as a rubber pad (not illustrated) may be coupled to the bottom surface of the base 160 so as to fix the position and to prevent sliding. The base 160 may have an adjustable base member (not illustrated) in which a contact surface with the floor can vary depending on a situation.

The cover 140 is inserted into one of the bag coupling portion 120 and the bag 170 and serves to close the mouth thereof. FIG. 2 illustrates a state in which the cover 140 passes through the bag coupling portion 120 and is inserted into the bag 170. The cover 140 includes a cover body 142, a packing 144, and a knob 146.

The cover body 142 has the same elliptical shape as the bag coupling portion 120 and the size may be slightly smaller than that of the bag coupling portion 120. The packing 144 is inserted into the circumference of the cover body 142 and the knob 146 is coupled to the top surface thereof.

The cover 140 can be located inside the bag coupling portion 120 as illustrated in FIG. 5. In this case, the packing 144 comes in close contact with the inner surface 128 of the bag coupling portion 120 to provide a sealing force. Accordingly, even when garbage (not illustrated) causing bad smell such as food garbage is placed in the bag 170, it is possible to prevent the bad smell from leaking outward by the cover 140.

The cover 140 may pass through the bag coupling portion 120 and may be located inside the bag 170. In this case, an amount of garbage placed in the bag 170 is small. The packing 144 comes in close contact with the inner surface of the bag 170 to provide a sealing force.

The knob 146 enables easy separation of the cover 140 from the bag 170 or the bag coupling portion 120.

The cover 140 according to this embodiment can be inserted into the bag 170 through the bag coupling portion 120, but the cover may have a structure which is hooked to the top of the bag coupling portion 120 and does not pass through the bag coupling portion 120 in another embodiment.

Usage of the bag supporting device 100 according to this embodiment will be described below with reference to FIGS. 1 to 5.

First, in order to insert the bag 170 onto the bag coupling portion 120, the pressing member 134 of the bag coupling portion 120 is bent inward as illustrated in FIGS. 1 and 3. Accordingly, the circumferential length of the bag coupling portion 120 decreases and the bag 170 having a constant mouth size can be easily inserted onto the bag coupling portion 120.

In the state illustrated in FIGS. 1 and 3, the bag 170 is inserted onto the bag coupling portion 120 from down to up. Since the rounded portion 126 is formed at the bottom of the bag coupling portion 120, the mouth of the bag 170 can be easily inserted onto the bag coupling portion 120.

After the bag 170 is inserted onto the bag coupling portion 120, the pressing member 134 is bent outward as illustrated in FIGS. 2 and 4. Since the pressing member 134 has elasticity, the pressing member can be deformed outward with its elasticity by only pulling the pressing member outward. When the pressing member 134 is deformed outward as illustrated in FIGS. 2 and 4, the outer surface 122 of the bag coupling portion 120 presses the inner circumference of the mouth of the bag 170 outward. Accordingly, the bag 170 is brought into close contact with the circumference of the bag coupling portion 120 and fixed thereto and the mouth thereof can be kept opened by the bag coupling portion 120.

The state illustrated in FIG. 2 is obtained by coupling the bag 170 to the bag coupling portion 120. A user can easily place garbage in the bag 170 of which the mouth is opened by the bag coupling portion 120. When the bag 170 is filled with garbage, the mouth of the bag 170 can be closed using the cover 140.

When the bag 170 is filled with garbage to a certain extent, the pressing member 134 is bent inward in the state illustrated in FIGS. 2 and 4 as illustrated in FIGS. 1 and 2. Accordingly, the bag coupling portion 120 pressing the inner circumference of the mouth of the bag 170 outward decreases in the circumferential length. Accordingly, it is possible to easily separate the bag 170 from the bag coupling portion 120.

While the invention is described above with reference to the embodiment, it will be understood by those skilled in the art that the invention can be modified and changed in various forms without departing from the spirit and scope of the invention described in the appended claims.

The invention claimed is:

1. A bag supporting device comprising:
 a bag coupling portion that presses an inner surface of a mouth of a bag to the outside by shape deformation and brings the mouth of the bag into close contact with an outer surface thereof while keeping the mouth of the bag opened, and wherein the bag coupling portion includes a through-hole that communicates with the mouth of the bag, wherein the bag coupling portion comprises a rigid member, at least one elastic member, and at least two bending points provided between the rigid and elastic members to allow the elastic member to be flipped between enlarged and reduced positions, and wherein the elastic member is moved from the enlarged position to the reduced position when an inward force is applied to the elastic member and is maintained at the reduced position when the inward force is removed.

2. The bag supporting device according to claim 1, wherein a frictional member is disposed on the outer surface of the bag coupling portion.

3. The bag supporting device according to claim 1, wherein the bag coupling portion is fixed to a position with a constant height by a support.

4. The bag supporting device according to claim 1, wherein a cover is coupled to the bag coupling portion.

5. The bag supporting device according to claim 1, wherein a thickness of the bending points is less than thicknesses of the rigid and elastic members.

\* \* \* \* \*